United States Patent [19]

Baumann

[11] 3,981,486
[45] Sept. 21, 1976

[54] SHOCK ABSORBER AND GUIDE RAIL ASSEMBLY INCLUDING THE SAME

[76] Inventor: Ernst Baumann, Schonlaterngasse 11, Vienna I, Austria

[22] Filed: Jan. 29, 1973

[21] Appl. No.: 327,866

[30] Foreign Application Priority Data

| Jan. 31, 1972 | Austria | 715/72 |
| Mar. 21, 1972 | Austria | 2395/72 |
| Aug. 9, 1972 | Austria | 6899/72 |
| Aug. 21, 1972 | Austria | 7187/72 |

[52] U.S. Cl. ............................... 256/13.1; 256/1
[51] Int. Cl.² ....................................... E01F 15/00
[58] Field of Search ............. 256/13.1, 1; 114/219; 293/60, 70, 84, 89, 91, 92, 93, DIG. 13

[56] References Cited
UNITED STATES PATENTS

| 1,474,907 | 11/1923 | McCormick | 256/13.1 UX |
| 1,480,086 | 1/1924 | Lyon | 293/98 X |
| 1,730,502 | 10/1929 | Gossman | 293/84 |
| 2,025,014 | 12/1935 | Brickman et al. | 256/13.1 |
| 2,030,782 | 2/1936 | Dennebaum | 256/13.1 |
| 2,060,128 | 11/1936 | Schulz | 256/13.1 |
| 2,089,929 | 8/1937 | Brickman et al. | 256/13.1 |
| 2,942,853 | 6/1960 | Glaros | 256/13.1 |
| 3,717,223 | 2/1973 | Alfes | 293/DIG. 3 |

FOREIGN PATENTS OR APPLICATIONS

| 263,842 | 8/1968 | Austria | 256/13.1 |
| 1,491,896 | 7/1967 | France | 256/13.1 |

*Primary Examiner*—Dennis L. Taylor
*Attorney, Agent, or Firm*—Karl W. Flocks

[57] ABSTRACT

The shock absorber comprises a metal strip which includes a bend and two legs extending from said bend and including an angle at said bend. Said legs are profiled in cross-section opposite to each other at said bend so that the strip is formed with folds at said bend. Said legs are adapted to be forced toward each other so as to reduce said angle and to dislocate at least part of at least one of said folds. The guide rail assembly comprises a guide rail, a stationary support and said shock absorber, one of the legs of which is connected to said guide rail and the other of the legs of which is connected to said support.

20 Claims, 75 Drawing Figures

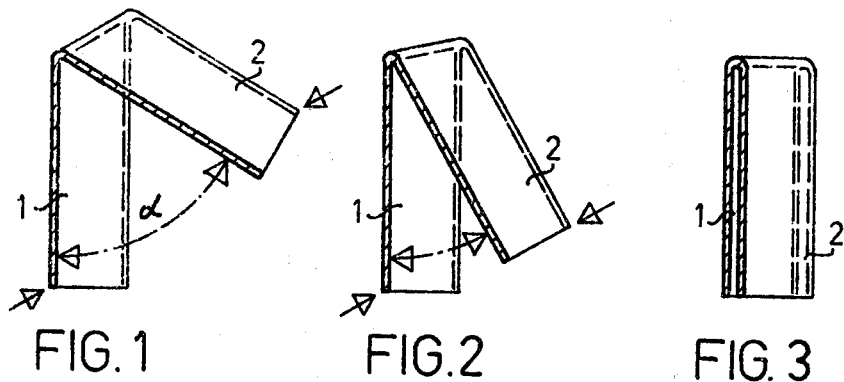
FIG. 1  FIG. 2  FIG. 3
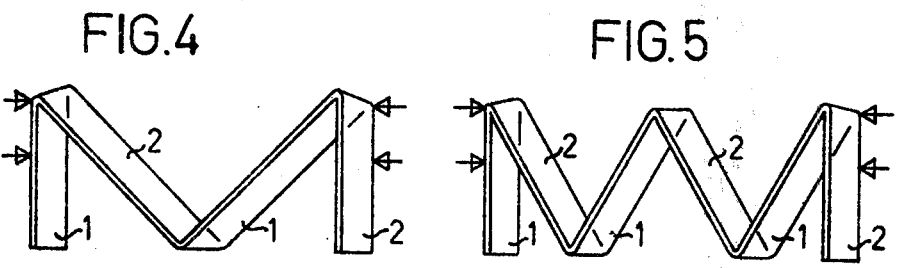
FIG. 4  FIG. 5
 FIG. 6  FIG. 7 
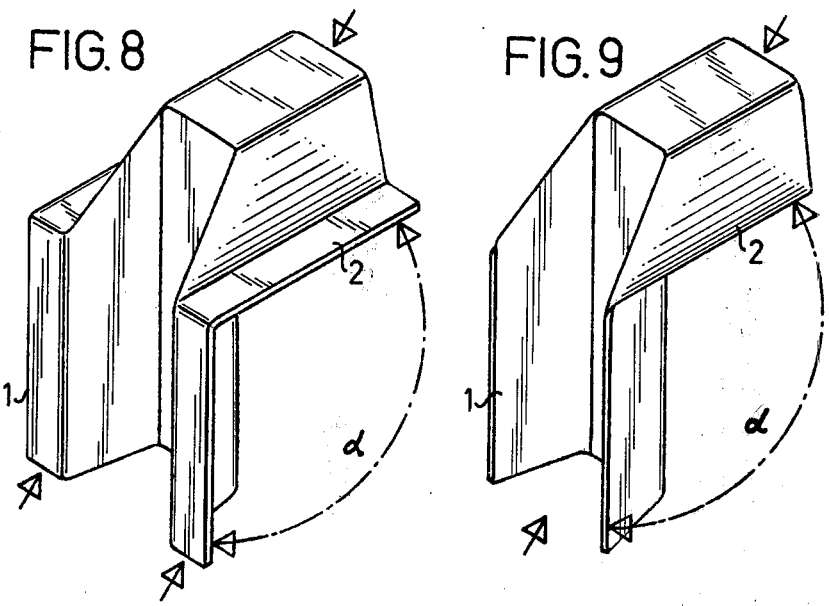
FIG. 8  FIG. 9

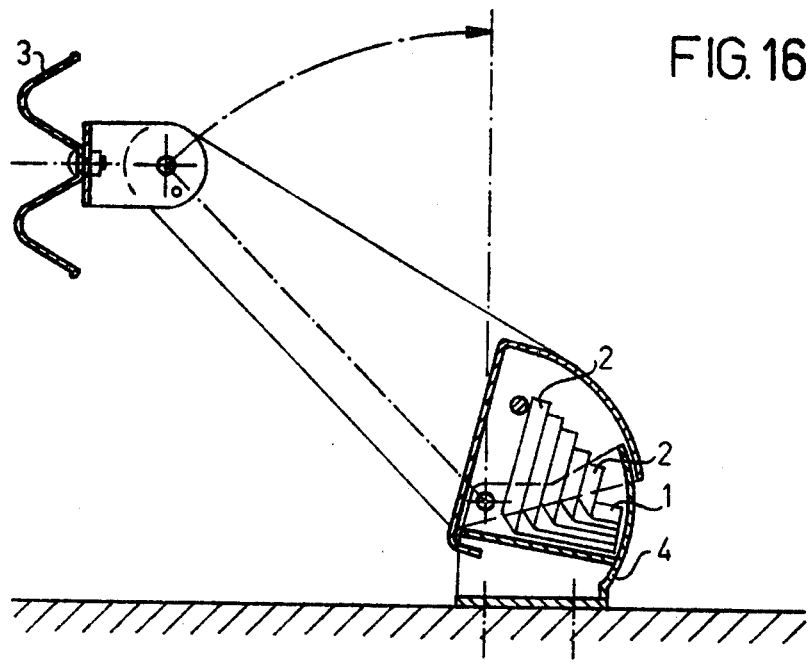
FIG. 16
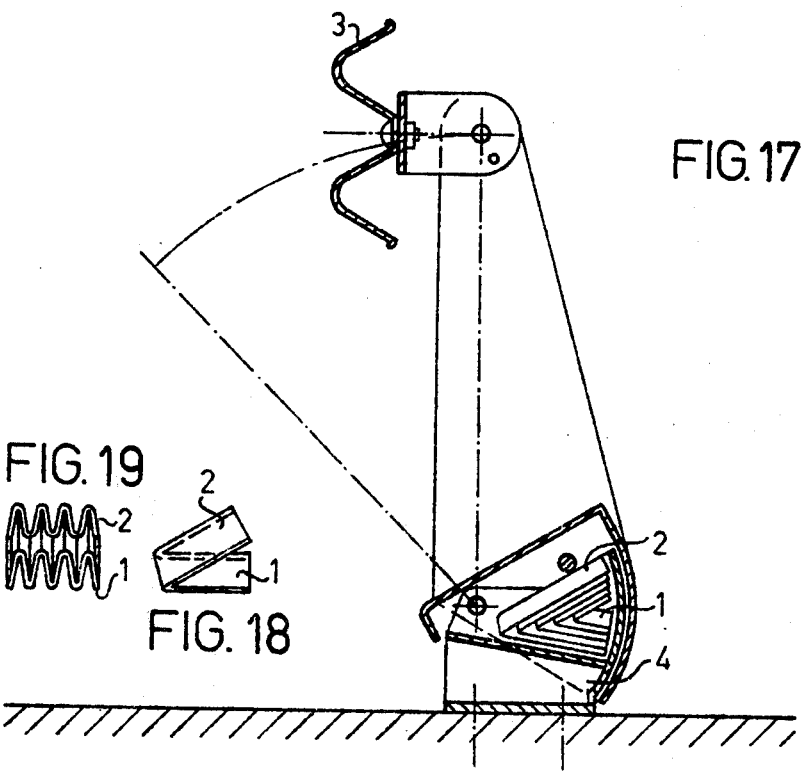
FIG. 17
FIG. 19
FIG. 18

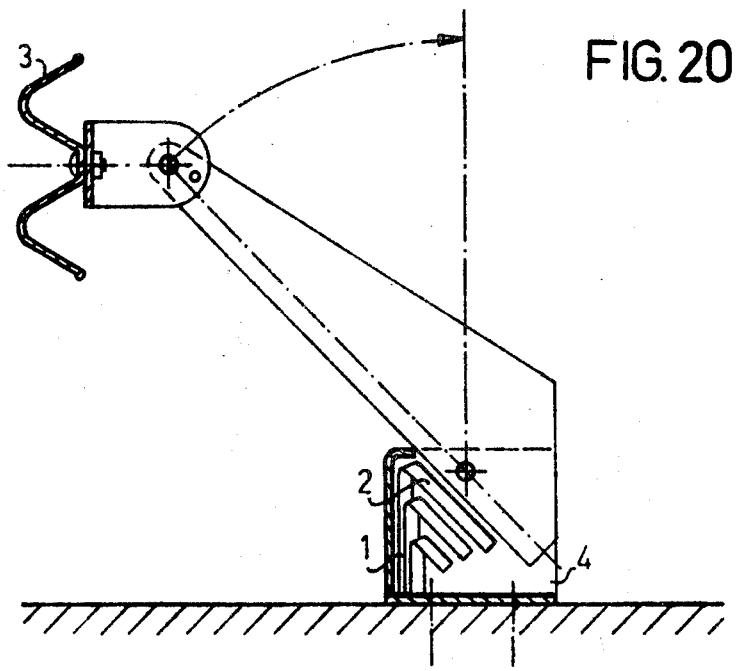
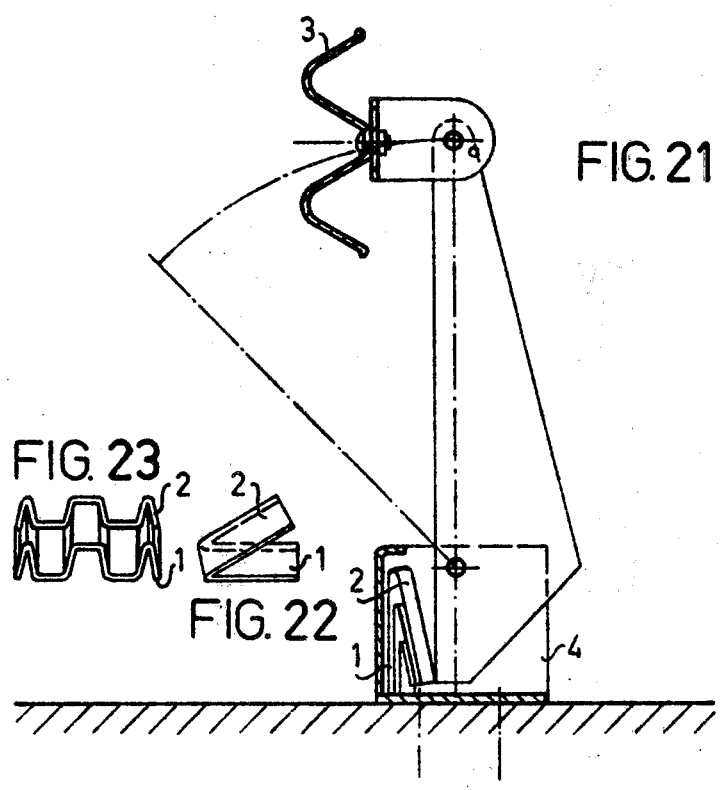

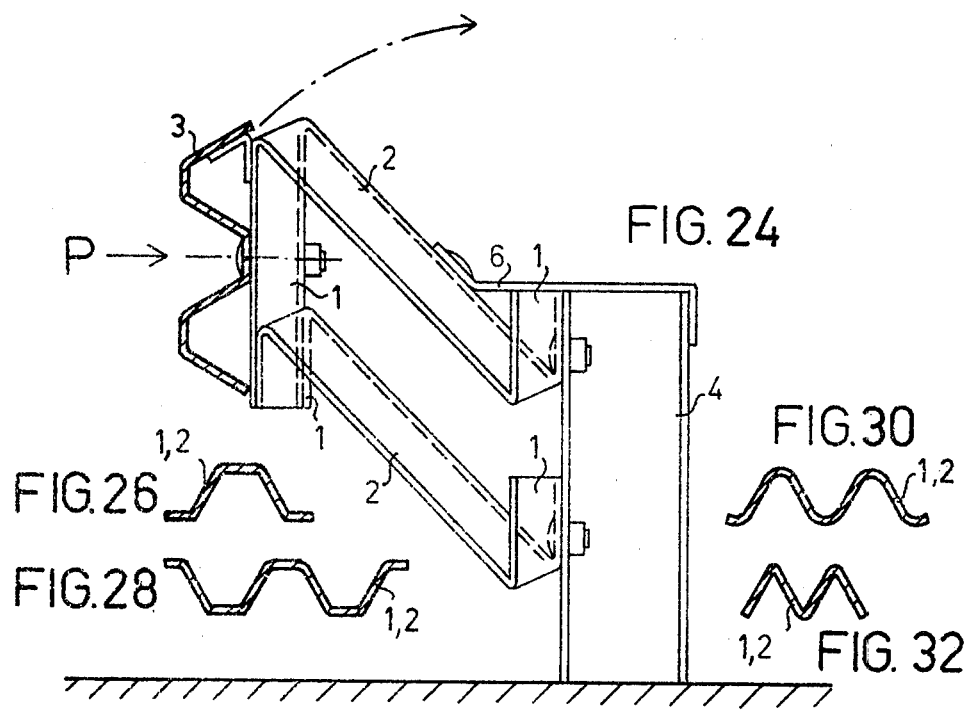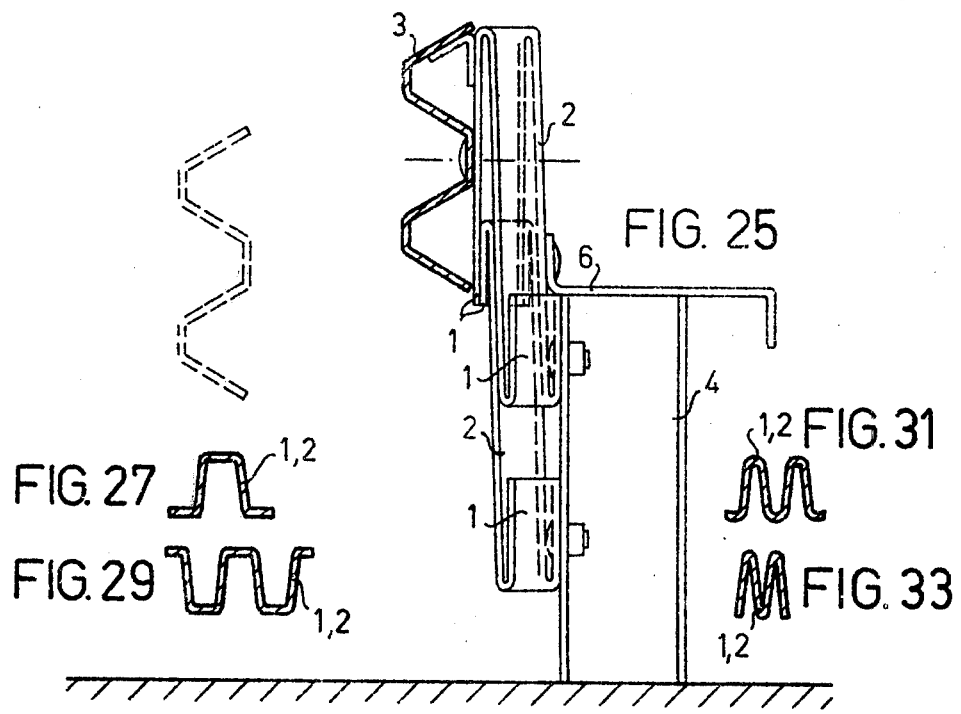

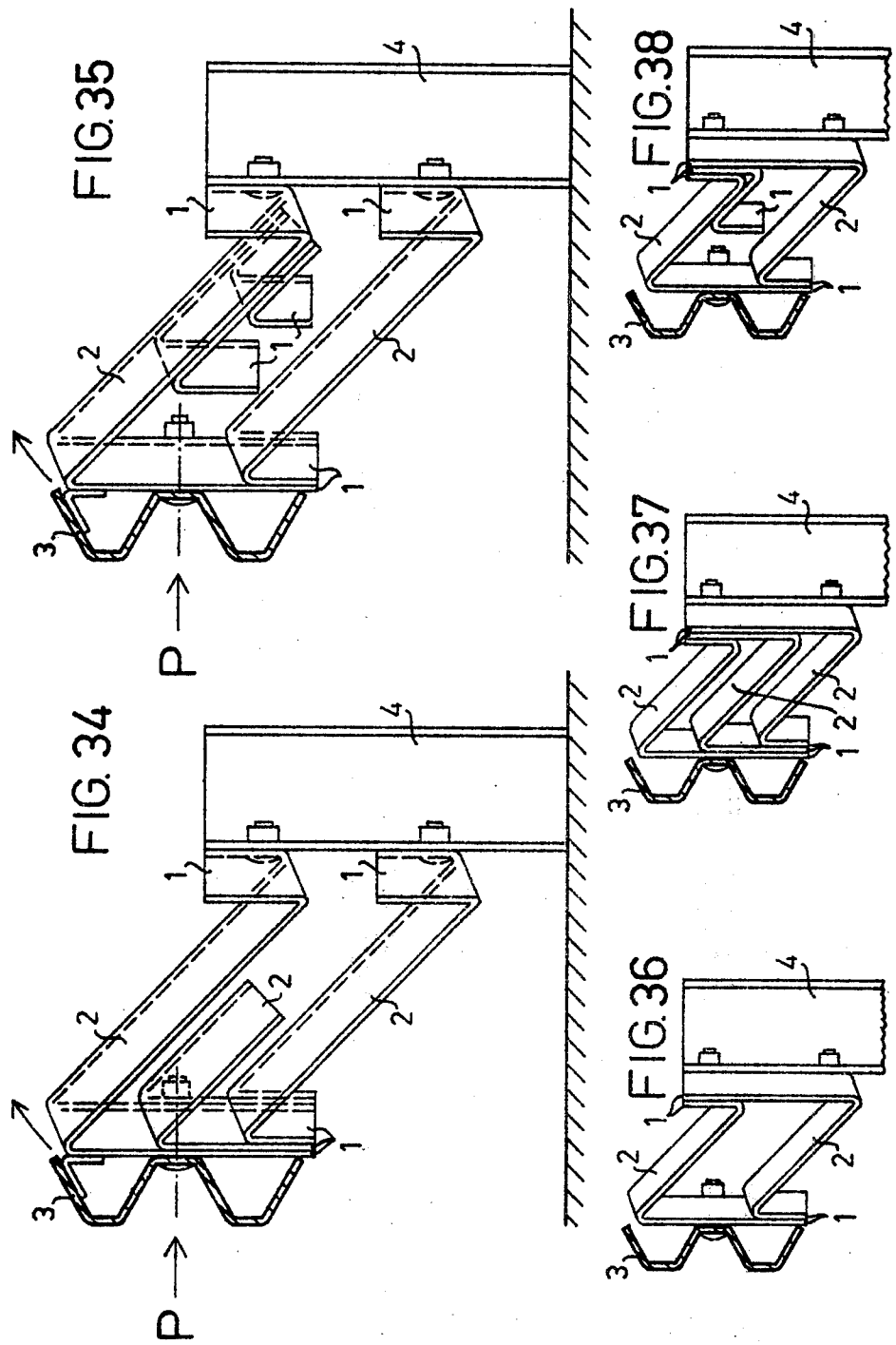

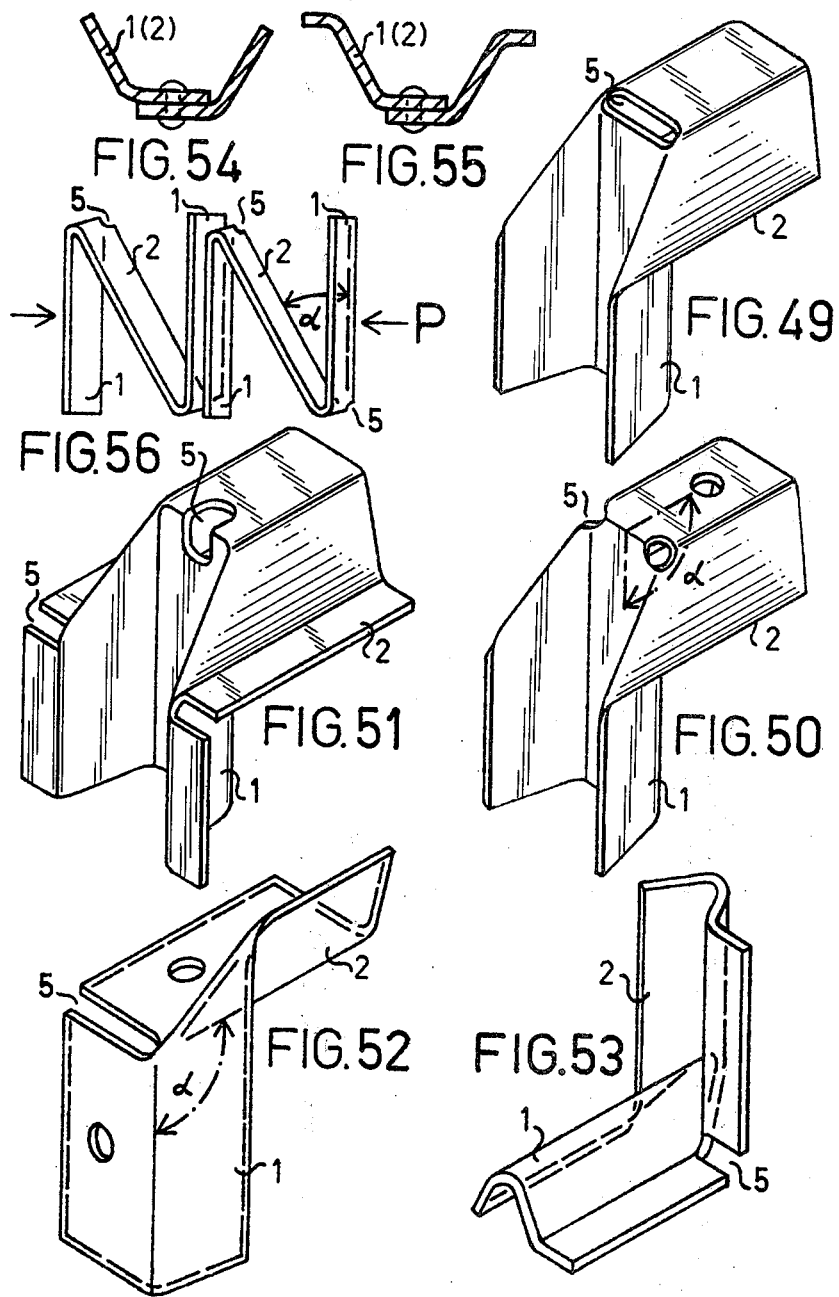

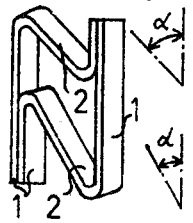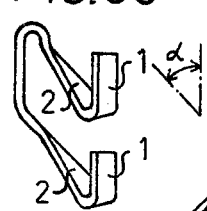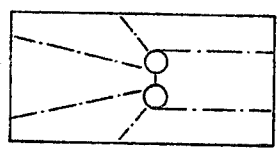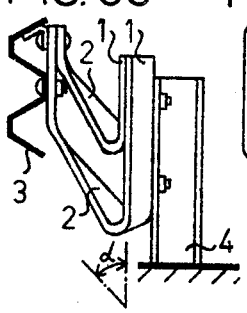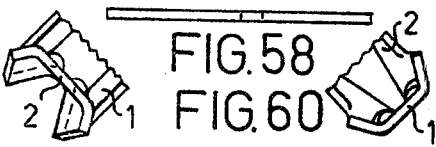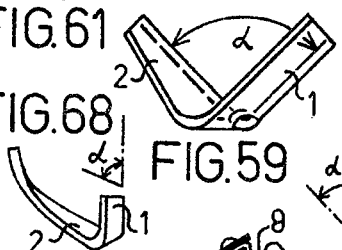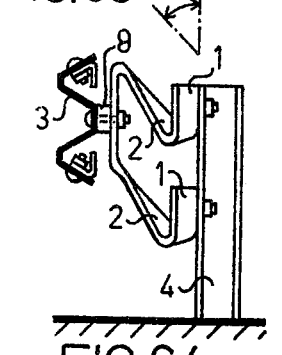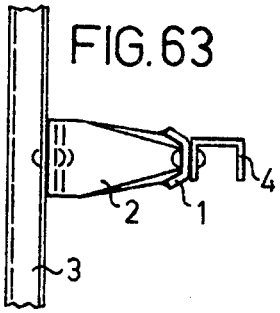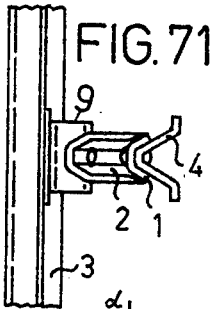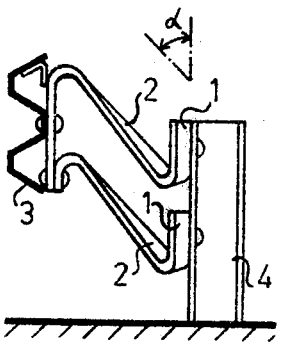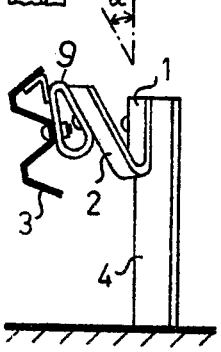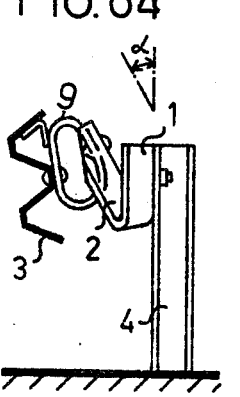

SHOCK ABSORBER AND GUIDE RAIL ASSEMBLY INCLUDING THE SAME

This invention relates to a shock absorber, particularly for guide rail assemblies.

Known shock absorbers in guide rail assemblies comprise a bent or angled metal strip, which is disposed between the guide rail and a post or the like and which is subjected to a permanent deformation by an impact of a vehicle on the guide rail. It is also known to provide such shock absorber in the form of a frame composed of a plurality of metal strips.

These known shock absorbers have the disadvantage that when their initial resistance has been overcome they suddenly yield to the impact energy so that they give only a poor effect.

In other guide rail assemblies, hydraulic means are provided to damp a movement of the guide rail. The hydraulic dashpots used for this purpose are expensive and add to the cost of the expensive structure which is required.

It is an object of the invention to provide a shock absorber in which the stated disadvantages are avoided and which is simple in structure, can readily be replaced, is inexpensive and particularly effective and enables a variation of the damping function, and also to provide a guide rail assembly which comprises such shock absorber.

According to the invention, this object is accomplished in that the shock absorber comprises at least two legs, which are angled to each other to include an angle $\alpha$ at least at the bend and from the same are substantially oppositely profiled, and at least one of the folds at the bend is at least partly dislocated when the legs are forced toward each other.

This novel shock absorber has the special advantage that the impact of a vehicle against the guide rail causes the two legs of the shock absorber, which legs are adjacent to a bend, to be forced toward each other so that folds are dislocated. As a result, as the legs are forced toward each other, new folds are formed in successive portions of the bent metal strip until a final position is reached. At least part of the impact energy is consumed in this process.

Further features and advantages of the invention will become apparent from the following explanatory description of embodiments shown by example on the accompanying drawings, in which:

FIG. 1 is a longitudinal sectional view showing a shock absorber having legs which include an angle $\alpha$.

FIG. 2 shows the shock absorber of FIG. 1 in a position in which its legs include a smaller angle $\alpha$.

FIG. 3 shows also the shock absorber of FIG. 1 in a position in which the legs abut.

FIG. 4 shows a shock absorber having four legs in a zigzag configuration.

FIG. 5 shows a shock absorber having six legs in a zigzag configuration.

FIGS. 6 and 7 are two transverse sectional views showing a leg.

FIG. 8 is a perspective view showing a shock absorber having legs which are trapezoidally profiled and have laterally bent edge portions.

FIG. 9 shows the same shock absorber as FIG. 8 but with legs having no laterally bent edge portions.

FIG. 16 shows a guide rail assembly in which a plurality of shock absorbers according to FIG. 1 are combined in a stack.

FIG. 17 shows the guide rail assembly of FIG. 16 with the shock absorbers compressed.

FIG. 18 is a side elevation showing a single shock absorber.

FIG. 19 is a front elevation of the shock absorber of FIG. 18.

FIG. 20 is a guide rail assembly comprising a set which comprises a plurality of shock absorbers having depending legs.

FIG. 21 shows the guide rail assembly of FIG. 20 with the shock absorbers compressed.

FIG. 22 is a side elevation showing the shock absorber of FIG. 21.

FIG. 23 is a front elevation showing the shock absorber of FIG. 22.

FIG. 24 is a side elevation showing another guide rail assembly, which comprises Z-shaped shock absorbers.

FIG. 25 shows the guide rail assembly of FIG. 24 with the shock absorbers compressed.

FIGS. 26 and 27, FIGS. 28 and 29, FIGS. 30 and 31, and FIGS. 32 and 33 show different profiles of shock absorbers before and after their legs have been compressed, respectively.

FIGS. 34 to 38 are side elevations showing different guide rail assemblies.

Figure 39:
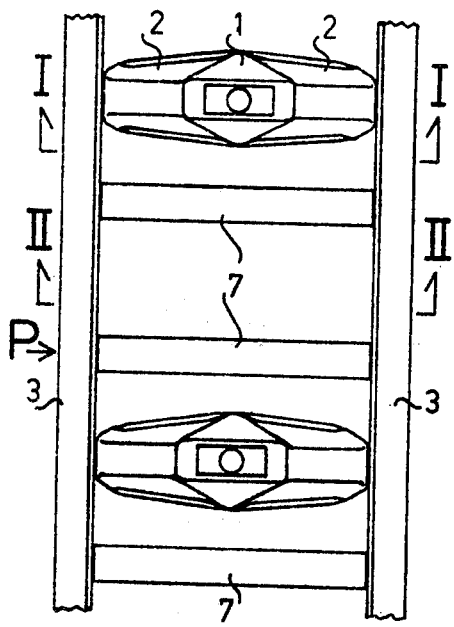

FIG. 39 is a top plan view showing guide rail assembly for use on a central reservation of a superhighway.

Figure 41:
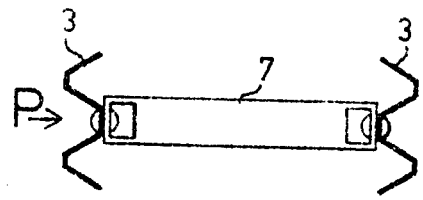
Figure 40:
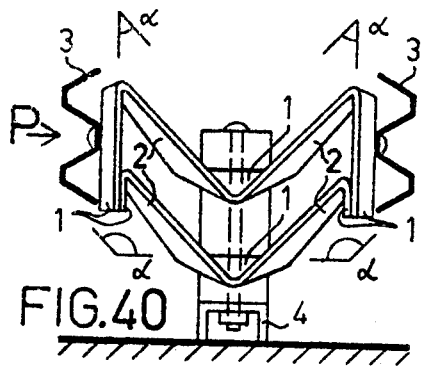
Figure 42:
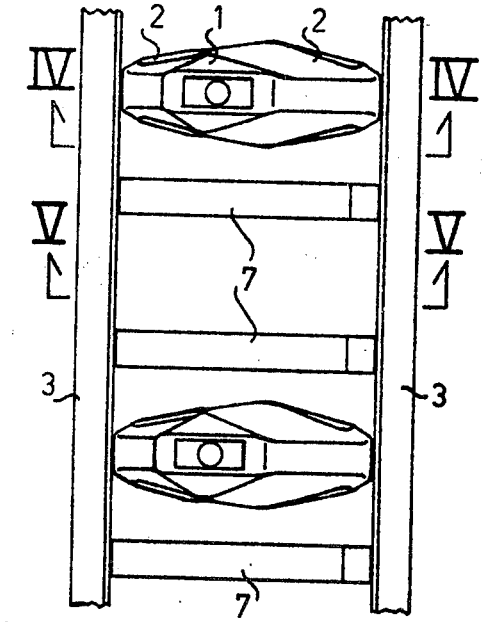

FIG. 40 is an elevation taken on line I—I in FIG. 39,

FIG. 41 an elevation taken on line II—II in FIG. 39,

FIG. 42 shows the guide rail assembly of FIG. 39 but with shock absorbers which are compressed and expanded, respectively.

Figure 43:
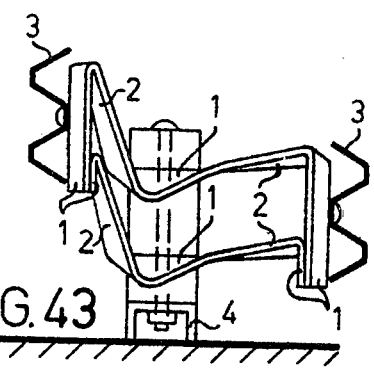

FIG. 43 is an elevation taken on line IV—IV in FIG. 42.

Figure 44:
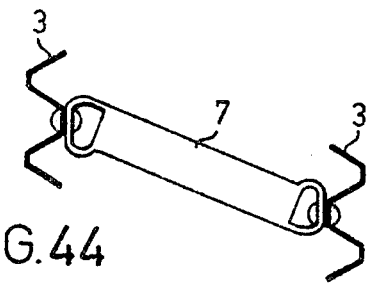

FIG. 44 is an elevation taken on line V—V in FIG. 42.

Figure 45:
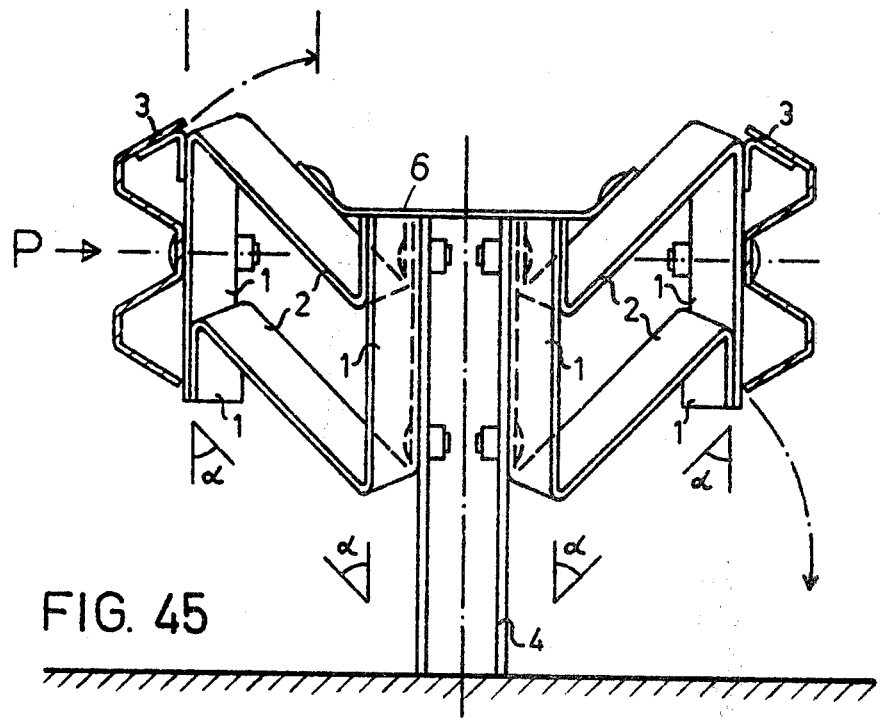

FIG. 45 is a side elevation showing another guide rail assembly for use on the central reservation of a superhighway.

Figure 46:
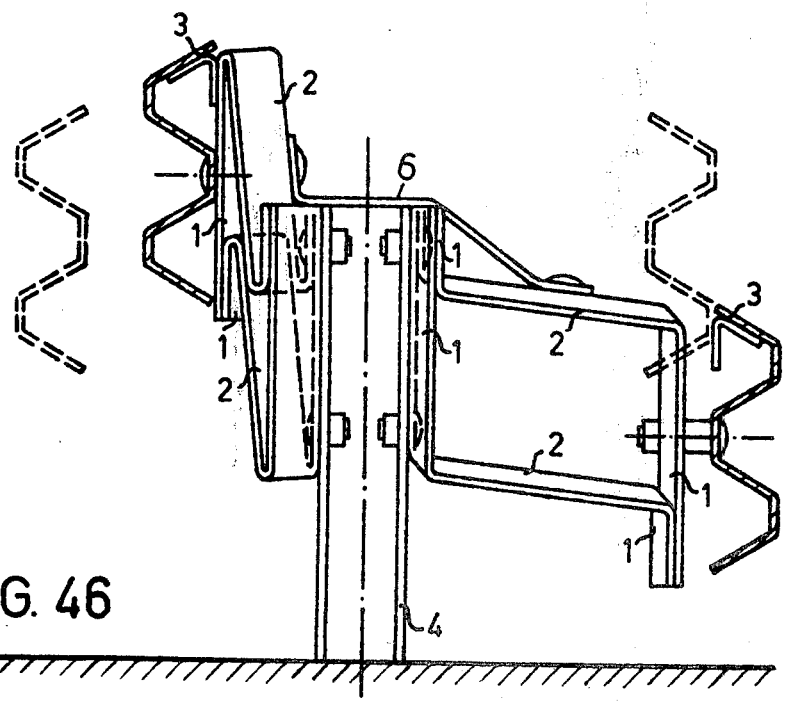

FIG. 46 shows the guide rail assembly of FIG. 45 after an impact.

Figure 47:
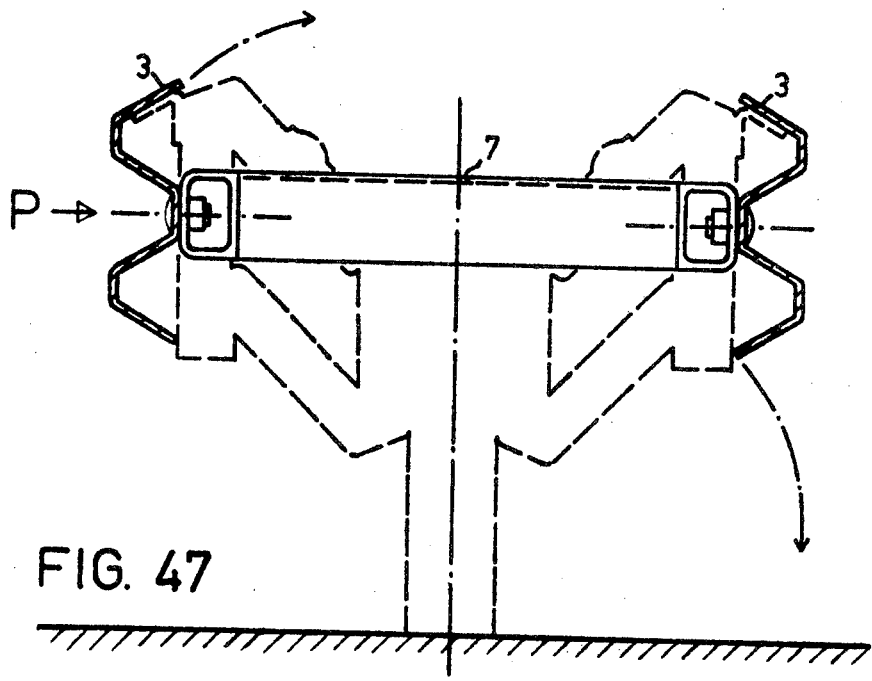

FIG. 47 is a side elevation showing a strut which connects the two guide rails of the guide rail assembly of FIG. 45.

Figure 48:
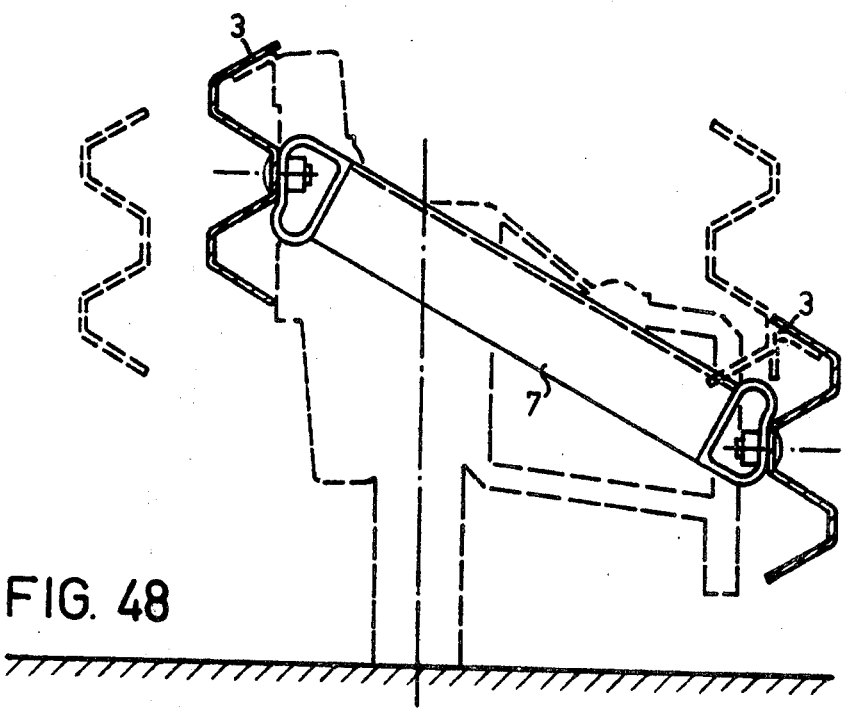

FIG. 48 is a side elevation showing the strut and guide rail assembly of FIG. 47 after an impact.

FIGS. 49 to 52 are perspective views showing different shock absorbers.

FIGS. 54 and 55 are transverse sectional views showing composite legs.

FIG. 56 is a side elevation showing a composite shock absorber consisting of a plurality of legs.

FIG. 57 is a top plan view showing a metal strip in which the fold lines are indicated by dash-dot lines.

FIG. 58 is an elevation showing the strip of FIG. 57.

FIG. 59 is a side elevation showing a shock absorber which has been made by bending the strip of FIG. 57.

FIG. 60 is a fragmentary view showing in elevation the shock absorber of FIG. 59.

FIG. 61 is another fragmentary view showing in elevation the shock absorber of FIG. 59.

FIG. 62 is a side elevation showing a guide rail assembly.

FIG. 63 is a top plan view showing the assembly of FIG. 62.

FIGS. 64 and 65 are side elevations showing additional guide rail assemblies.

FIGS. 66 to 69 are side elevations showing shock absorbers.

FIG. 70 is a side elevation showing a guide rail assembly.

FIG. 71 is a top plan view showing the guide rail assembly of FIG. 70.

FIG. 72 is a side elevation showing another guide rail assembly.

Figure 73:
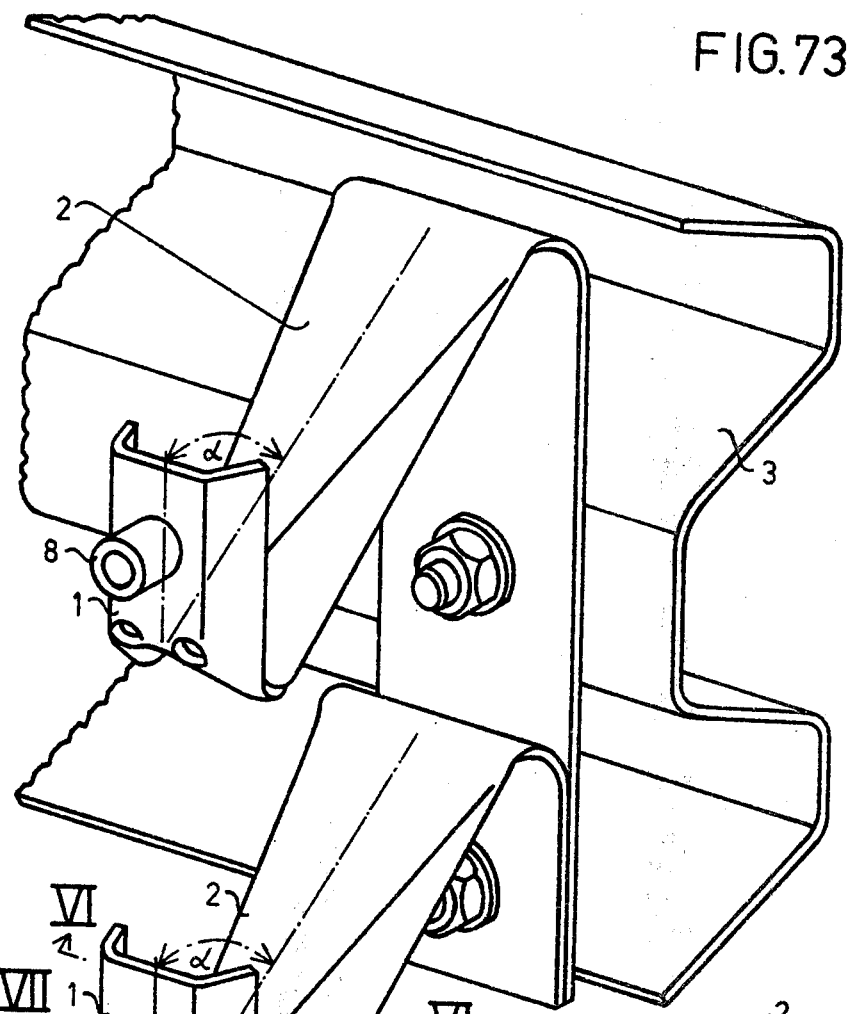

FIG. 73 is a perspective view showing the guide rail assembly of FIG. 62 but without posts.

Figure 74:
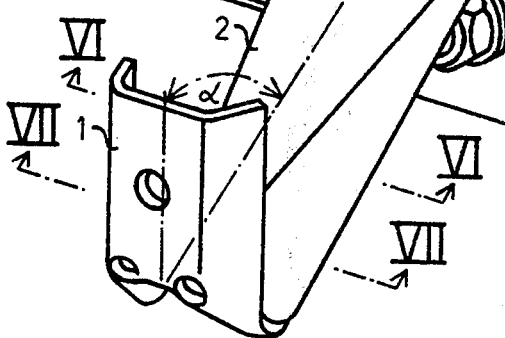

FIG. 74 is a sectional view taken on line VI—VI in FIG. 73 and

Figure 75:
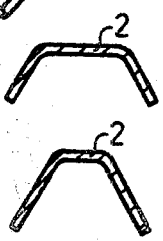

FIG. 75 is a sectional view taken on line VII—VII in FIG. 73.

The shock absorber according to the invention which is shown in FIG. 1 consists of an angled and profiled metal strip which comprises two legs 1 and 2, which include an angle α with each other and are provided with mutually oppositely directed longitudinal profiles. Folds are formed at the bend of the metal strip and correpond substantially to the geometric line of intersection between the two legs.

FIG. 2 shows the two legs 1 and 2 compressed to some extent so that the angle α is smaller than in FIG. 1. Besides, the folds include a more obtuse angle with the right-hand vertical edge of the leg 1 than in FIG. 1.

FIG. 3 shows the shock absorber in its completely compressed position, in which the two legs snugly abut so that the angle α equals zero and the angle between the folds and the right-hand vertical edge of the leg 1 equals 90°. It is apparent that the folds are continuously moved as the two legs 1 and 2 are compressed. At the same time, the profiles of the two legs are slightly contracted.

According to FIGS. 4 and 5, the shock absorber may consist of a plurality of legs 1, 2, which form, e.g., a Z-shaped or zigzag configuration.

FIG. 6 is a transverse sectional view showing a leg which has a corrugated profile and FIG. 7 is a transverse sectional view showing a leg which has a zigzag profile.

According to FIG. 8, each of the two legs 1 and 2 has a substantially trapezoidal profile which has laterally bent edge portions. FIG. 9 shows legs which are trapezoidal in cross-section.

Figure 10:
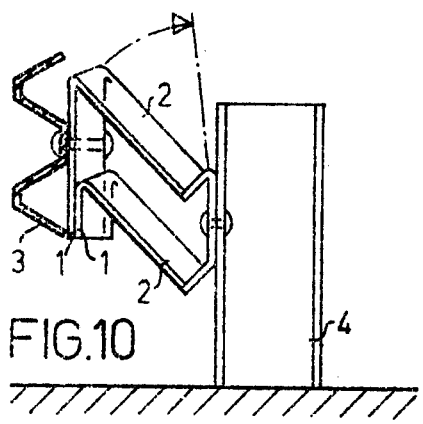
FIG. 10 shows a guide rail assembly comprising a guide rail carrier which is composed of two shock absorbers.
Figure 11:
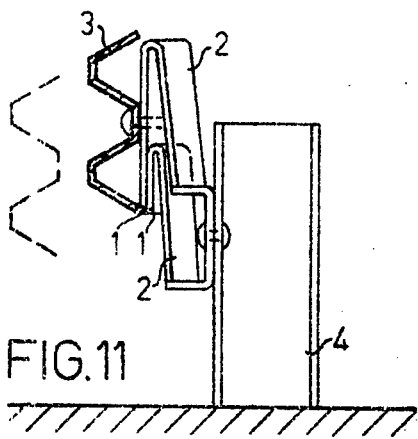
FIG. 11 shows the same guide rail assembly as FIG. 10 but with compressed shock absorbers.

FIG. 10 shows a guide rail assembly which comprises a support 4, e.g., a post or the like. A spacer is screw-connected to the support 4 and is connected to the substantially parallel legs 2 of two shock absorbers. the legs 1 of the shock absorbers are joined by welding or with screws or rivets or the like and are connected by a screw to a guide rail 3. If a vehicle impinges on the guide rail in a horizontal direction, the guide rail will be pivotally moved upwardly against the post. In this process, the legs of the shock absorbers act like links of parallel motion and constrain the guide rail to move exactly along a circular cylinder (FIG. 11). It is apparent that the shock absorber does not only damp the impact but also holds the guide rail on its support.

Like reference characters are used in all figures of the drawings for like parts.

Figure 12:
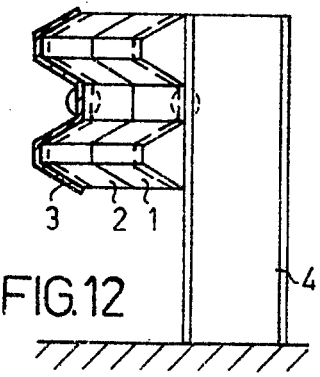
FIG. 12 is a side elevation showing another guide rail assembly.
Figure 13:
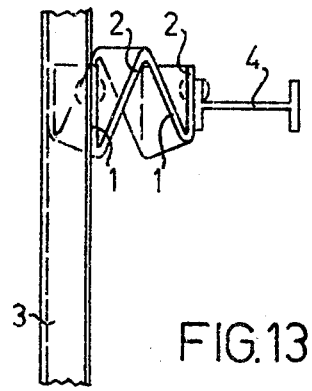
FIG. 13 is a top plan view showing the guide rail assembly of FIG. 12.

According to FIGS. 12 and 13, the guide rail 3 is secured to the support 4 by means of a zigzag-shaped shock absorber, which has a profile conforming to that of the guide rail. In case of a horizontal impact of a vehicle on the guide rail, the shock absorber is compressed substantially in a horizontal direction.

Figure 14:
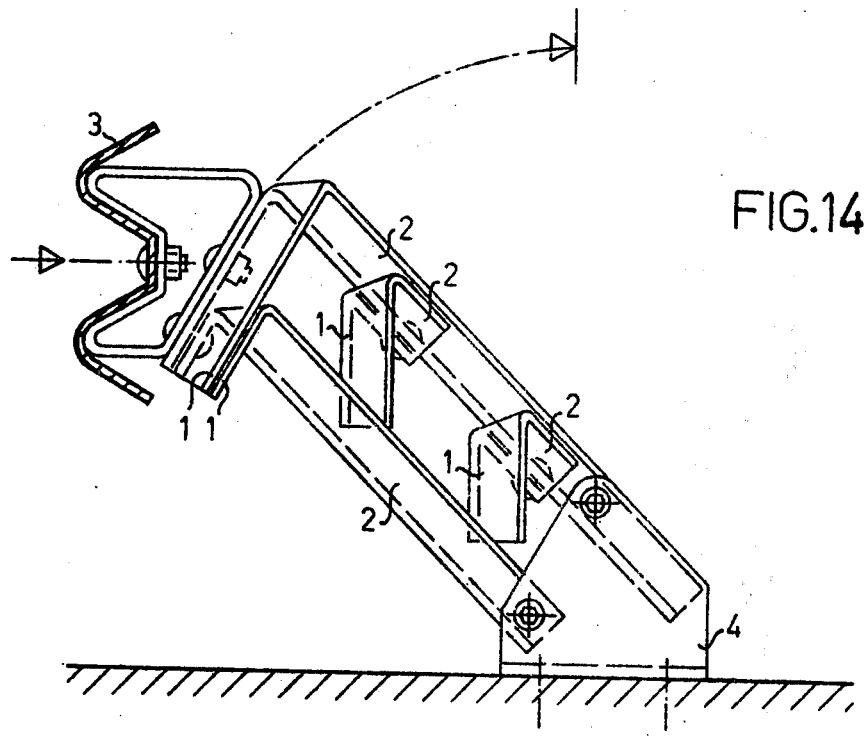
FIG. 14 is a side elevation showing another guide rail assembly comprising shock absorbers according to FIG. 1.
Figure 15:
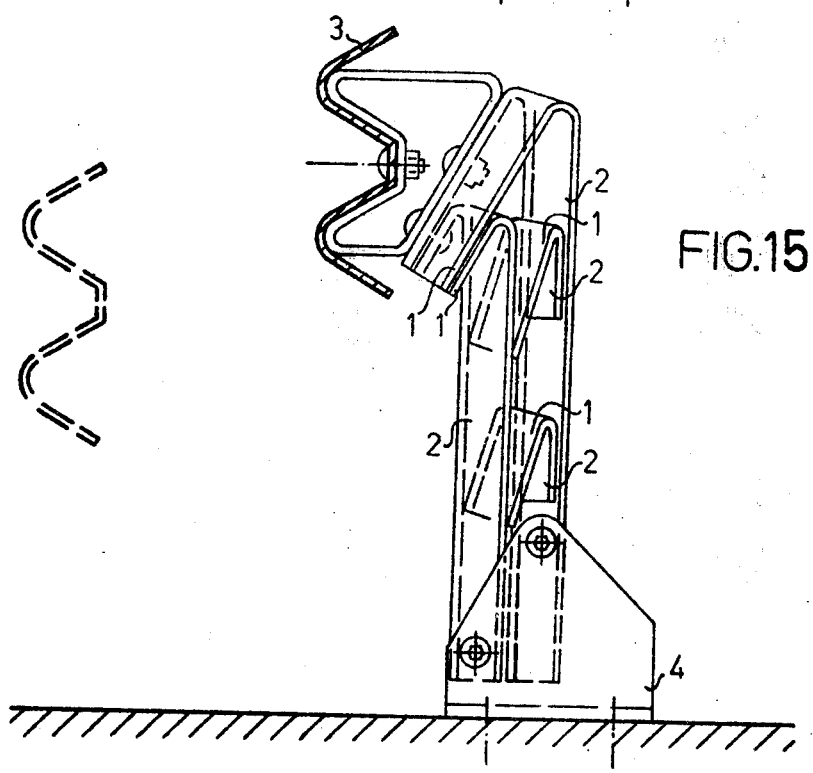
FIG. 15 shows the guide rail assembly of FIG. 14 but with compressed shock absorbers.

The parallel legs 2 of two shock absorbers of a guide rail assembly as shown in FIGS. 14 and 15 are pivoted at their lower ends to support plates 4, and the legs 1 are screw-connected to the guide rail 3 with a spacer interposed. Two additional shock absorbers are disposed between the legs 2 and have legs 2 riveted to one of the parallel legs 2 whereas their legs 1 depend and differ in length. In case of an impact of a vehicle on the guide rail, the long parallel legs 2 of the shock absorbers constrain the guide rail to perform an upward pivotal movement along a large arc toward the vertical line which extends through the point where the upper leg 2 is pivoted to the support plates 4. The large damping movement which is thus performed to consume the impact energy ensures a particularly soft cushioning of the vehicle. The strong upward pivotal movement of the guide rail 3 prevents the vehicle also from moving over the rail. A very important feature of this design resides in that the guide rail 3 is constrained to perform exactly a predetermined pivotal movement in every phase thereof. The legs 2 may be stiffened or extended in length by profiled bars or the like. The shock absorbers are disposed so that their knees are upwardly and their legs 1, 2 are downwardly directed. As a result, water can flow down more easily so that the danger of corrosion is reduced. The depending legs are also less liable to cause injuries. Having legs 1, 1 differing in length, the additional shock absorbers disposed between the parallel legs 2, 2 act in succession. As a result, the damping resistance increases as a vehicle impinges on the guide rail. This result can also be produced in an alternative arrangement, in which a plurality of shock absorbers are provided, which are spaced apart and have aligned legs. When the legs of the outermost shock absorber are compressed, the legs of the remaining, inner shock absorbers will be compressed too. The additional shock absorbers may also be provided at other points of the guide rail assembly. It will be desirable if the legs of all shock absorbers are joined to form a stack, e.g., by welding or by screws, as is shown in FIGS. 16, 17, 20, 21. The damping may be changed in that the several shock absorbers are made from sheet metal of different gages. Besides, the length of the legs may be varied.

According to FIGS. 16, 17, 20 and 21, the shock absorbers combined in a stack are disposed in a box, which is secured to the support plate 4, and in case of an impact are compressed by a lever, which is connected to the guide rail (FIGS. 17, 21).

The shock absorbers according to the invention are removably mounted so that after an impact of the vehicle those of the remaining parts of the guide rail assembly which have not been damaged can be re-used.

Various embodiments of shock absorbers are shown in FIGS. 18, 19, 22, 23. When the legs 1 and 2 are compressed, the profile of the legs will be contracted adjacent to the folds until the profile webs and the side faces of the rooflike portions are very steep. Only when this has been accomplished is the dislocation of the folds initiated so that the actual damping begins. There will be a slight damping action, however, before the dislocation of the folds begins. The more steeply the profile webs and the sides of the rooflike portions are initially disposed, the faster will an intense damping begin. This property of the shock absorber according to the invention may also be utilized to vary the damping action in that shock absorbers are used which have legs that have profiles differing in width.

The legs of a shock absorber according to the invention may also be provided with length extension means or stiffened by rods, profiled bars, tubes or the like. These rods or the like may be provided as spacers between the guide rail and the support plate or the post.

Shock absorbers which effect or increase a damping may be disposed between two such spacing rods or the like, which are spaced apart and preferably parallel and particularly pivoted. In shock absorbers having several legs, the latter may be angled several times in the same sense.

According to FIGS. 24 and 25, two shock absorbers bent in Z shape have parallel legs 1, which are secured to the post 4 and the guide rail 3, respectively. The legs 2 of the two shock absorbers are parallel to each other and are downwardly inclined from the support 4. An additional mounting strap 6 is secured to the upper leg 2. In that embodiment too, an impact of a vehicle causes an upward pivotal movement of the guide rail toward the support 4 so that a soft cushioning of the vehicles is ensured without a rebound. Because the guide rail is moved upwardly, the vehicle will not roll over the rail.

FIGS. 34 to 38 show guide rail assemblies provided with Z-shaped shock absorbers. In the assemblies shown in these figures, the upwardly extending legs 1 of the shock absorbers are secured to the post 4 and the downwardly extending legs of the shock absorbers are secured to the guide rail 3. The legs 2 of the shock absorbers are parallel to each other. In the assemblies shown in FIGS. 34 and 35, each of the upwardly extending legs 1 of the shock absorbers is individually secured to the support 4 whereas the downwardly extending legs 1 of the shock absorbers overlap or are combined in a stack. In the assemblies shown in FIGS. 36 to 38, the upwardly extending legs 1 of the shock absorbers are also combined in a stack. In the assembly of FIG. 39, another shock absorber is disposed between the parallel legs 2 of the two shock absorbers and comprises a downwardly extending leg 1, which is fitted in the stack of the remaining legs 1. In the assembly of FIG. 35, the legs 2 of two additional shock absorbers are secured to the upper leg 2 of one shock absorber and the other legs 1 of the additional shock absorbers extend substantially vertically downwardly and differ in length. The assembly shown in FIG. 37 comprises another shock absorber which is bent in Z shape and has legs 1 that are fitted in the stacks of the legs 1 of the other two shock absorbers whereas the leg 2 of the additional shock absorber is parallel to the legs 2 of the two other shock absorbers.

In the assembly shown in FIG. 37, an additional Z-shaped shock absorber is provided, which has an upwardly extending leg 1 that is fitted into the stack of the legs 1 of the other two shock absorbers whereas its other leg 1 extends vertically upwardly and its leg 2 engages the leg 2 of the upper shock absorber. All guide rail assemblies according to FIGS. 34 to 38 constrain the guide rail to move substantially along the surface of a circular cylinder toward the support after an impact of a vehicle, whereas the additional shock absorbers ensure an increasing damping.

FIGS. 39 to 44 show a guide rail assembly in which two shock absorbers having more than two bent legs include intermediate legs 1, which are screw-connected to a support strap 4 and to a U-shaped support, respectively, with spacers interposed. Each of the two shock absorbers comprises upwardly extending legs 2, which are disposed on opposite sides of the support strap 4 and merge into downwardly extending legs 1, which engage each other and carry the guide rail 3. The legs 2 of the two shock absorbers are disposed on opposite sides of the support strap 4 and extend substantially parallel to each other. In areas outside the support straps 4 or posts or the like, the two guide rails 3 are interconnected by struts 7 or the like which are substantially rigid in compression (FIGS. 39, 41, 42, 44) so that the two opposite shock absorbers are also substantially rigidly connected.

An impact of a vehicle on one of the two guide rails 3 will be transmitted at least in part to the opposite other guide rail 3 by the struts 7 adjacennt to the point of impact. As a result, those legs of the shock absorbers which are disposed on the side which is impinged upon are compressed whereas those legs of the shock absorbers which are disposed on the opposite side are pulled apart and bent away from the support straps or other supports. This results in an increased damping. An additional damping is also due to the tie rod effect of the two guide rails. The guide rail subjected to the impact is pivotally moved upwardly and toward the support. The opposite guide rail performs a downward pivotal movement away from the support. When the legs 1, 2 on that side of the shock absorbers which is opposite to the impinged side are pulled apart, the profile of the legs adjacent to the bend is somewhat flatter. As is apparent from FIG. 44, the struts 7 are also deformed in their fixing portions in case of an impact. FIGS. 45 to 48 show another guide rail assembly, in which two Z-shaped shock absorbers are provided on each side of the post 4 and the upwardly directed legs of these shock absorbers overlap and are secured to respective sides of the support. The two legs 2 of each shock absorber are parallel to each other and the two legs 1 disposed adjacent to the respective guide rails extend downwardly and overlap and carry respective guide rails 3. The two shock absorbers are connected by the holding strap 6. As is apparent from FIGS. 47 and 48, the two guide rails 3 are interconnected outside the supports by struts 7 which are substantially rigid in compression. The guide rail assemblies shown in FIGS. 45 to 48 have the same mode of action as those shown in FIGS. 39 to 44.

The two shock absorbers may be secured to one and the same support or to different supports. Individual legs may be stiffened or increased in length or may be additionally flanged, angled or the like at the edges. The legs of the shock absorbers are provided with holes or the like for fixation. To facilitate the manufacture or to improve the function, the shock absorbers may be perforated, slotted, slit or the like. They need not be secured directly to the support or the like but may be secured to spacers, which extend from the support, and they may be directly or indirectly joined to the guide rail, e.g., by screws, by welding or the like. It will be sufficient if the shock absorbers are supported on the support, e.g., by a plug connection, although a screw-threaded connection is usual. All screw-threaded connections of the guide rail assembly may be replaced by welded joints.

To enable the use of small tools, the shock absorbers may be composed of a plurality of parts. Because after an impact of a vehicle on a guide rail the upright supports driven into the ground, such as posts or the like, will usually be deformed and can be replaced only with difficulty, it will often be desirable to use low posts, which consist of components which are screw-connected and secured to stationary U-shaped members, rails or the like. The screws or tie rods or similar members associated with these posts may have a rated breaking point. This has the advantage that the screws will not tear off until the shock absorbers have been deformed. This will prevent vehicles from becoming caught by shock absorbers or supports. The vehicles will then be held only by the guide rails. Those shock absorbers which cooperate in assemblies comprising two guide rails need not lie in a plane but may be disposed one beside the other. The legs of the shock absorbers may have profiles which increase or decrease in height and width.

According to FIG. 49, apertures 5 are provided in the fold at the bend between two trapezoidal, oppositely profiled legs 1, 2, and these apertures consist according to FIG. 50 of two lateral holes, according FIG. 51 of an elongated hole and slots in turned-up edge portions of the legs, and according to FIGS. 52 and 53 of a slot. The provision of such apertures in the folds affords the advantage that the dislocation imparted to the folds as the legs are forced toward each other can be exactly predetermined and controlled and the manufacture of the shock absorber is simplified. The dislocation of the folds as the legs are forced toward each other may be controlled, e.g., so that the dislocation occurs more in the middle of the cross-sections or more at their edges. At the junctions of a plurality of folds, a provision of holes or the like will be desirable to avoid stresses in the material and a formation of cracks which might be due to such stresses. The apertures may be used as marks in the manufacture of the shock absorbers. To stiffen individual legs, their edge portions differ from those of adjacent legs, for instance by being flanged or laterally or reversely bent.

FIG. 52 shows a metal strip which has been bent to form an unsymmetrical shock absorber having legs which at the bend are formed with equal and opposite longitudinal profiles.

Two unsymmetrical shock absorbers according to FIG. 52 may be connected by welding or by screws or rivets to form a shock absorber having a symmetrical profile (FIGS. 54, 55) and laterally bent stiffening edge portions (FIG. 55).

According to FIG. 56, two shock absorbers bent in Z shape and provided at the bends with holes 5 contact each other at their parallel legs 1 to form a unit. The legs of the left-hand shock absorber have a higher profile than those of the right-hand shock absorber so that the damping resistance is smaller in the first phase of the deformation than in the last.

The shock absorbers may be arranged to form a parallelogram or several cooperating parallelograms. The damping effected by a plurality of cooperating parallelograms may be varied by the use of different profile cross-sections or different thicknesses of material.

FIGS. 57 and 58 show a metal strip before it is bent, with the fold lines indicated in the drawings. Holes are provided at the junctions of a plurality of fold lines to avoid undesired stresses in the material during the bending operation.

FIG. 59 shows the metal strip which has already been bent to form a shock absorber having legs 1 and 2, which include the angle α. This shock absorber is shown in FIG. 60 as viewed on the end of the leg 1 and in FIG. 61 as viewed on the end of leg 2. It is apparent from FIG. 59 that the folds are not sharp-edged but formed by transitional surfaces, e.g., portions of cylindrical or conical surfaces. In the shock absorber shown in FIGS. 59, 60, 61, the inner profile is narrower than the outer profile at least adjacent to the bend.

FIG. 62 shows a guide rail assembly comprising two shock absorbers, which are disposed between the guide rail 3 and the post 4. Each shock absorber is bent substantially in Z shape but consists adjacent to the guide rail of a flat, laterally bent metal strip and gradually merges into a profile adjacent to the leg 2, which extends downwardly toward the post. The upwardly extending leg 1 is secured to the support and is formed with an equal and opposite profile. The guide rail 3 is formed at its top edge with an angled portion, which bears on the flat metal strip of one shock absorber. The two legs 2 are substantially parallel to each other. With this design, a small initial damping will be effected in case of an impact of a vehicle on the guide rail. In the top plan view shown in FIG. 63, the transition between the profiled leg 2 and the unprofiled metal strip can well be recognized.

The guide rail assembly shown in FIG. 64 comprises a shock absorber having two legs 1 and 2, which have equal and opposite profiles. The two legs 2 are substantially parallel and are interconnected by a flat portion of the metal strip. Adjacent to the flat portion, the shock absorber is connected to the guide rail 3 with a spacer 8 interposed. The guide rail is provided at its top and bottom edges with angled supporting portions. The spacer 8 ensures a softer initial damping.

FIG. 65 shows a guide rail assembly which is similar to that of FIG. 62. Each shock absorber is U-shaped and the legs 1, on the one hand, and the flat portions of the shock absorbers, on the other hand, are stacked and connected by screws to the post and to the guide rail, respectively.

FIG. 66 shows a shock absorber which has been made from a metal strip and is similar to the shock absorber of the guide rail assembly of FIG. 64. The shock absorber of FIG. 67 is similar to that of FIG. 66 with the exception that the lower leg 2 is offset so that the damping function can be improved.

FIG. 68 shows a shock absorber in which the leg 2 is bent.

FIG. 69 shows two shock absorbers bent in Z shape associated with each other so that the parallel legs 1 form stacks whereas the legs 2 have different inclinations. If the guide rail is secured to the left-hand side of the two shock absorbers and their right-hand side is connected to the post, an impact of a vehicle will cause the guide rail not only to perform a pivotal movement along a surface of a circular cylinder but will also rotate the guide rail relative to the post so that the vehicle cannot roll over the guide rail and is forced onto the road surface.

FIGS. 70, 71, and 27 show a shock absorber having a leg 1 which contacts and is secured to the post 4 whereas the leg 2 is connected by a spacing sleeve 9 to the guide rail. The guide rail is provided at its top edge with an angled portion, which bears on the spacing sleeve 9. The corresponding legs in FIGS. 70, 71, and 72 have equal and opposite profiles.

FIG. 73 shows the same guide rail assembly as FIG. 62 but without posts. The transitions of the several profiles are particularly distinctly apparent from FIG. 73. The cross-sectional profiles of the leg 2 of the lower shock absorber in FIGS. 74 and 75 show clearly how the profile becomes flatter.

What is claimed is:

1. A guide rail assembly having at least one guide rail and stationary support means being connected to the guide rail via shock absorber means, said shock absorber means comprising a metal strip having at least one bend, the two legs of the shock absorber means extending from said bend including an angle and being profiled in cross section opposite to each other near said bend and transverse to the direction of extension of said legs from said bend, said strip being formed with folds at said bend, at least a part of at least one of said folds being dislocated upon moving the two legs toward each other, so as to reduce said angle, one leg of the shock absorber means being connected to the stationary support means and another leg being connected to the guide rail.

2. An assembly as set forth in claim 1, in which said stationary support means consists of a plurality of posts.

3. An assembly as set forth in claim 1, in which said strip is formed with at least one aperture at said bend.

4. An assembly as set forth in claim 1, in which said legs are formed with ribs having slightly inclined webs.

5. An assembly as set forth in claim 1, in which said legs are formed with longitudinal profiles having sligntly inclined webs.

6. An assembly as set forth in claim 1, in which at least one of said legs has a cross-sectional profile which has different heights in different cross-sections.

7. An assembly as set forth in claim 1, in which at least one of said legs has a cross-sectional profile which has different widths in different cross-sections.

8. An assembly as set forth in claim 1, in which at least one of said legs tapers in height and width.

9. An assembly as set forth in claim 1, in which at least one of said legs has a cross-sectional profile which decreases in height from said bend.

10. An assembly as set forth in claim 1, in which at least one of said legs has a laterally bent portion having an unprofiled cross-section remote from said bend.

11. An assembly as set forth in claim 1, in which at least one of said legs is curved.

12. An assembly as set forth in claim 1, in which one of said legs comprises an inside profiled portion adjacent to said bend, the other of said legs comprises an outside profiled portion adjacent to said bend and to said inside profiled portion, and said inside and outside profiled portions differ in width.

13. An assembly as set forth in claim 1, in which at least one of said legs has a first portion having a cross-sectional profile of a first predetermined geometric configuration, a second portion having a cross-sectional profile of a second predetermined geometric configuration, and a third portion forming a continuous transition between said first and second geometric configurations.

14. An assembly as set forth in claim 1, in which at least one of said legs is downwardly inclined from said guide rail toward said support.

15. An assembly as set forth in claim 1, which comprises at least two unsymmetrical parts which are assembled to form a substantially symmetrical structure.

16. An assembly as set forth in claim 1, in which said folds are curved.

17. An assembly as set forth in claim 1, in which said folds are curved in accordance with portions of cylindrical surfaces.

18. An assembly as set forth in claim 1, in which said folds are curved in accordance with conical surfaces.

19. A guide rail assembly having at least one guide rail and stationary support means being connected to the guide rail via a first and a second shock absorber means, each shock absorber means comprising a metal strip having at least one bend, the two legs of each shock absorber means extending from said bend including an angle and being profiled in cross section opposite to each other near said bend and transverse to the direction of extension of said legs from said bend, that strip being formed with folds at said bend, at least a part of at least one of said fold being dislocated upon moving the two legs toward each other, so as to reduce said angle, one leg of the shock absorber means being connected to the stationary support means and another leg being connected to the guide rail, said inclined legs of said two shock absorber means being spaced one above the other.

20. An assembly as set forth in claim 19, in which said leg connected to said guide rail extends downwardly and said leg connected to said support extends upwardly.

* * * * *